United States Patent
Prudkovskiy (12)

(10) Patent No.: US 11,960,597 B2
(45) Date of Patent: Apr. 16, 2024

(54) METHOD AND SYSTEM FOR STATIC ANALYSIS OF EXECUTABLE FILES

(71) Applicant: F.A.C.C.T. NETWORK SECURITY LLC, Moscow (RU)

(72) Inventor: Nikolay Prudkovskiy, Moscow (RU)

(73) Assignee: F.A.C.C.T. NETWORK SECURITY LLC, Moscow (RU)

( * ) Notice: Subject to any disclaimer, the term of this patent is extended or adjusted under 35 U.S.C. 154(b) by 449 days.

(21) Appl. No.: 17/462,107

(22) Filed: Aug. 31, 2021

(65) Prior Publication Data

US 2022/0179948 A1    Jun. 9, 2022

(30) Foreign Application Priority Data

Dec. 7, 2020   (RU) ........................... RU2020140017

(51) Int. Cl.
*G06F 21/54*   (2013.01)
*G06N 20/00*   (2019.01)

(52) U.S. Cl.
CPC ............. *G06F 21/54* (2013.01); *G06N 20/00* (2019.01); *G06F 2221/033* (2013.01)

(58) Field of Classification Search
None
See application file for complete search history.

(56) References Cited

U.S. PATENT DOCUMENTS

| | | | |
|---|---|---|---|
| 10,546,125 B1 | 1/2020 | Zeng | |
| 11,398,990 B1 * | 7/2022 | Cabrera | H04L 43/0817 |
| 2017/0364826 A1 * | 12/2017 | Mitarai | G06N 20/10 |

(Continued)

FOREIGN PATENT DOCUMENTS

| | | |
|---|---|---|
| RU | 2654146 C1 | 5/2018 |
| RU | 2722692 C1 | 6/2020 |

OTHER PUBLICATIONS

Radwan, A.M., Oct. 2019. Machine learning techniques to detect maliciousness of portable executable files. In 2019 International Conference on Promising Electronic Technologies (ICPET) (pp. 86-90). IEEE. (Year: 2019).*

(Continued)

*Primary Examiner* — Luu T Pham
*Assistant Examiner* — Edward X Long
(74) *Attorney, Agent, or Firm* — BCF LLP

(57) ABSTRACT

A method and a system for analysis of executable files are provided. The method comprises: obtaining a plurality of training executable files including at least one malicious executable file and at least one benign executable file; analyzing the plurality of training executable files to extract therefrom data including a plurality of features; transforming the data organizing the plurality of features in sets of features, a given one of which includes features of a respective predetermined type; identifying, in the given set of features, informative features indicative of a given training executable file being one of malicious and benign; combining, over the plurality of training executable files, for the respective predetermined data type, the informative features to generate at least one feature vector; and training, based on the at least one feature vector, at least one of classifier to determine if an in-use executable file is one of malicious and benign.

12 Claims, 5 Drawing Sheets

(56) References Cited

U.S. PATENT DOCUMENTS

2019/0005239 A1    1/2019  Park et al.
2019/0012460 A1*  1/2019  Hartnett ................ G06F 21/566

OTHER PUBLICATIONS

Cohen, A., Nissim, N. and Elovici, Y., 2020. MalJPEG: Machine learning based solution for the detection of malicious JPEG images . IEEE Access, 8, pp. 19997-20011. (Year: 2020).*
Search Report with regard to the Russian counterpart Patent Application No. 2020140017 completed Oct. 11, 2021.

* cited by examiner

METHOD AND SYSTEM FOR STATIC ANALYSIS OF EXECUTABLE FILES

CROSS-REFERENCE

The present application claims priority to Russian Patent Application No.: 2020/140,017, entitled "METHOD AND SYSTEM FOR STATIC ANALYSIS OF EXECUTABLE FILES," filed on Dec. 7, 2020, the entirety of which is incorporated herein by reference.

FIELD

The present technical solution relates to the field of cybersecurity, and in particular, to a computer-implemented method and system for analysis of executable files for maliciousness.

BACKGROUND

Static code analysis is an analysis of software code that is performed without launching and executing the software applications in question. Within the framework of the present description, it is assumed that the purpose of the analysis is to determine whether the software application in question belongs to malicious or safe, i.e., "clean" software application.

Certain prior art approaches have been proposed to address the above-identified technical problem.

US Patent Application Publication No.: 2019/005,239-A1 published on Jan. 3, 2019, assigned to Samsung Electronics Co Ltd., and entitled "ELECTRONIC DEVICE FOR ANALYZING MALICIOUS CODE AND METHOD THEREFOR" discloses a method for analyzing a malicious code by an electronic device, the method comprising the steps of: receiving an executable file; before the received executable file is installed, analyzing the executable file so as to collect suspected malicious code data from the executable file; normalizing the collected suspected malicious code data and analyzing the same on the basis of a probability model algorithm, so as to make a determination on the suspected malicious code data; and outputting the result of the determination.

Russian Patent No.: 2,654,146-C1 issued on May 16, 2018, assigned to Kaspersky Lab AO, and entitled "SYSTEM AND METHOD OF DETECTING MALICIOUS FILES WITH THE USE OF ELEMENTS OF STATIC ANALYSIS" discloses a system and method for determining whether an electronic file is malicious. An exemplary method includes extracting resources from an electronic file; forming a first rule that establishes a functional dependency between the extracted resources; identifying, in a database of malicious file resources, a second rule associated with one or more of the extracted resources; comparing the formed first rule with the identified second rule to calculate a degree of similarity between first and second rules; and determining the electronic file to be a malicious file when the calculated degree of similarity exceeds a predetermined threshold value.

Russian Patent No.: 2,722,692-C1 issued on Jun. 3, 2020, assigned to Group-IB TDS, LLC, and entitled "METHOD AND SYSTEM FOR DETECTING MALICIOUS FILES IN A NON-ISOLATED MEDIUM" discloses a method for detecting malicious files in a non-isolated medium that comprises: a preparatory step, including: generating a collection of files, which contains at least one malicious executable file and at least one non-malicious executable file; analyzing at least one executable file, wherein: extracting data from binary and disassembled types of executable file, based on which parameters are created for further training classifier, wherein additionally by statistical method determining parameters characteristic of malicious files and/or vice versa is not malicious; wherein first and second flow graph is extracted; based on obtained parameters first and second feature vector are constructed; creating an ensemble of classifiers from: first trained classifier based on first feature vector, a second trained classifier based on a second feature vector; third classifier, trained based on first flow graph, fourth classifier, trained on second flow graph, wherein for each classifier a decision priority is determined in advance; working stage, at which: obtaining, at least, one executable file; trained at the preparatory stage classifier ensemble, to detect malicious executable files; analysis result is output.

SUMMARY

Developers of the present technology have devised a method and system for static analysis of executable files that avoid the steps of graph analysis and neural network use, as contemplated by the prior art, which may allow accelerating both the system development process itself and the final verdict making process. Furthermore, the present methods and systems do not include disassembling of analyzed executable files, which allows avoiding disassembly errors and multiple program branches with overlapping instructions—which makes it challenging to build a control flow graph, as well as code obfuscation, etc.

The above prior art solutions are directed to solving the problem of identifying malicious files in a system before they are launched. However, it is worth noting that developers are constantly improving their malicious software, which reduces the probability of detection thereof in a system and complicates file analysis.

The present methods and systems are directed to eliminating the inconveniencies noted in the prior art. More specifically, the present methods and systems are directed to analyzing, using predictive models, the executable files based on features obtained in the process of examining the structure of associated PE-files and indicators of compromise identified by malicious code analysis specialists.

More specifically, in accordance with a first broad aspect of then present technology, there is provided a computer-implemented method for static analysis of executable files using predictive models. The method is executable by a processor of a computing device. The method comprises, in a training phase: obtaining, by the processor, a plurality of training executable files, the plurality of training executable files including at least one malicious training executable file and at least one benign training executable file; analyzing, by the processor, each one of the plurality of training executable files to extract data therefrom including a plurality of features of each one of the plurality of training executable files; transforming, by the processor, the data organizing the plurality of features in sets of features, a given one of which includes features of a respective predetermined type; enriching, by the processor, the given set of features with additional features of the respective predetermined type for increasing accuracy of a respective predictive model to be applied to the given set of features, the respective predictive model having been configured for identifying informative features of the respective predetermined type, the informative features being indicative of a given training executable file being one of malicious and benign, the enriching including: enriching the given set of features with at least one of additional feature obtained after examining PE files and indicators of compromise having been identified by human specialists in analysis of malicious code; applying, by the processor, to the given set of features, the respective predictive model to identify therein the informative features indicative of the given training executable file being one of malicious and benign, thereby generating at least one feature vector, training, by the processor, based on the at least one feature vector, at least one of an ensemble of classifiers to determine if an in-use executable file is one of malicious and benign; and assigning, by the processor, to each one of the ensemble of classifiers, a respective weight value indicative of a priority of a respective predicted indicator thereof associated with the in-use executable file amongst respective predicted indicators of other ones of the ensemble of classifiers. Further, in an in-use phase, the method comprises: obtaining, by the processor, the in-use executable file; analyzing, by the processor, the in-use executable file, to extract therefrom data including in-use features; transforming, by the processor, the data organizing the in-use features in at least one in-use set of features; generating, by the processor, based on the at least one in-use set of features, a respective in-use feature vector; applying, by the processor, each one of the ensemble of classifiers to the respective in-use feature vector to generate the respective predicted indicator of the in-use executable file being one of malicious and benign; applying, by the processor, to the respective predicted indicators generated by the ensemble of classifiers, respective weight values associated therewith to generate respective weighted predicted indicators of the in-use executable file being one of malicious and benign; determining, by the processor, an aggregate predicted indicator based on the respective weighted predicted indicators; and in response to the aggregate predicted indicator being indicative of the in-use executable file being malicious, generating, by the processor, a report including an analysis result of the in-use executable file.

In some implementations of the method, the respective predetermined data type of features associated with the given training executable file is indicative of one of: (i) dense features including at least numerical attributes, further including at least one of: section sizes of the given training executable file, sizes of the given training executable file in a memory, a number of libraries of the given training executable file, a number of imported symbols in of the given training executable file; and indicators of compromise having been identified by human specialists in analysis of malicious code; (ii) strings; (iii) URLs; (iv) manifests including metadata of the given training executable file; (v) imports including features extracted from an import table associated with the given training executable file; (vi) exports including features extracted from an export table associated with the given training executable file; (vii) resources including features extracted from a resource catalogue associated with the given training executable file; (viii) blacklisted strings including strings having been identified as being suspicious; (ix) local variables tls associated with the given training executable file; and (x) relocations including features extracted from an address settings table associated with the given training executable file.

In some implementations of the method, the transforming the data includes at least one of: cleaning the data, the cleaning including at least one of: filling missing values, detecting and removing data noise and outliers; transforming features of the given set of features, the transforming including (i) normalizing the data of the features to reduce a dimensionality of the respective feature vector; and (ii) bringing the features to a predetermined range of values; compacting the data, the compacting including sampling at least one of the features and attributes to be included in the given set of features; sampling the data, the sampling including converting continuous attributes to categorical attributes; and cleaning a text associated with the given set of features, the cleaning including removing predetermined symbols.

In some implementations of the method, transforming a numerical feature includes applying at least one of: removal of the numerical feature, dummy substitution, mean substitution, frequently used value substitution, regression substitution, a maximum likelihood estimation (MLE) method, and the normalizing the data of the features includes applying at least one of: Z-scaling, linear scaling, and a principal component analysis (PCA).

In some implementations of the method, the transforming further includes transforming text data into numerical data, including at least one of: label encoding by mapping each category to a respective predetermined unique integer; one-hot encoding; and vectorizing using a TF-IDF (Term Frequency-Inverse Document Frequency) algorithm.

In some implementations of the method, a quality of each one of the ensemble of classifiers is determined using an error minimization function in accordance with an equation:

$$0.8\frac{FP}{TN+FP} + 0.2\frac{FN}{TP+FN} \to \min,$$

where TN is a number of correctly classified benign executable files,

FP is a number of falsely classified benign executable files (type I error),

TP is a number of correctly classified malicious executable files, and

FN is a number of falsely classified malicious executable (type II error).

In some implementations of the method, the respective weight value being inversely proportional to a respective error minimization function value determined when assessing a quality of the given classifier, and wherein the respective weight values associated with each one of the ensemble of classifiers are further normalized such that a sum thereof is equal to 1.

In some implementations of the method, a given classifier of the ensemble of classifiers is built based on a Random Forest algorithm.

In some implementations of the method, the analysis result includes one of: (i) a detailed analysis result including the respective weighted predicted indicators of each classifier in the ensemble of classifiers; and (ii) a complex analysis result including the aggregate predicted indicator of the ensemble of classifiers.

In some implementations of the method, a given weighted predicted indicator of a respective one of the ensemble of classifiers in the detailed analysis result includes one of: a maliciousness score of the in-use executable file expressed as a value from 0 to 1, and a value of '−1' if the in-use executable file includes no features of the respective predetermined type associated with the respective one of the ensemble of classifiers; and a categorical result determined based on an internal decision threshold of the respective one of the ensemble of classifiers and expressed as one of: "malicious", "benign", and "unknown".

In some implementations of the method, the complex result is expressed by one of: a number representative of the maliciousness score of the in-use executable file taking values from 0 to 1, where 0 corresponds to the in-use executable file being benign, and 1 corresponds to the in-use executable file being malicious; and the categorical result which takes a value "malicious" if the aggregate predicted indicator of the ensemble of classifiers is greater than 0.5, and a value "benign" otherwise.

Further, in accordance with a second broad aspect of the present technology, there is provided a system for static analysis of executable files using predictive models. The system comprises a processor; and a non-transitory computer-readable medium storing instructions. The processor, upon executing the instructions, in a training phase, is configured to: obtain a plurality of training executable files, the plurality of training executable files including at least one malicious training executable file and at least one benign training executable file; analyze each one of the plurality of training executable files to extract data therefrom including a plurality of features of each one of the plurality of training executable files; transform the data organizing the plurality of features in sets of features, a given one of which includes features of a respective predetermined type; enrich the given set of features with additional features of the respective predetermined type for increasing accuracy of a respective predictive model to be applied to the given set of features, the respective predictive model having been configured for identifying informative features of the respective predetermined type, the informative features being indicative of a given training executable file being one of malicious and benign, by: enriching the given set of features with at least one of additional feature obtained after examining PE files and indicators of compromise having been identified by human specialists in analysis of malicious code; apply to the given set of features the respective predictive model to identify therein the informative features indicative of the given training executable file being one of malicious and benign, thereby generating at least one feature vector, train, based on the at least one feature vector, at least one of an ensemble of classifiers to determine if an in-use executable file is one of malicious and benign; and assign, to each one of the ensemble of classifiers, a respective weight value indicative of a priority of a respective predicted indicator thereof associated with the in-use executable file amongst respective predicted indicators of other ones of the ensemble of classifiers. Further, in an in-use phase, the processor is configured to: obtain the in-use executable file; analyze, the in-use executable file, to extract therefrom data including in-use features; transform the data organizing the in-use features in at least one in-use set of features; generate, based on the at least one in-use set of features, a respective in-use feature vector; apply each one of the ensemble of classifiers to the respective in-use feature vector to generate the respective predicted indicator of the in-use executable file being one of malicious and benign; apply, to the respective predicted indicators generated by the ensemble of classifiers, respective weight values associated therewith to generate respective weighted predicted indicators of the in-use executable file being one of malicious and benign; determine an aggregate predicted indicator based on the respective weighted predicted indicators; and in response to the aggregate predicted indicator being indicative of the in-use executable file being malicious, generate a report including an analysis result of the in-use executable file.

in the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF DRAWINGS

Non-limiting embodiments of the present technology are described herein with reference to the accompanying drawings; these drawings are only presented to explain the essence of the technology and are not limiting the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to identifying and blocking malicious files before they are launched to prevent potential harm to computing systems. The present methods include methods of static analysis of portable executable (PE) files to solve such problems resolving some of limitations associated with using the PE files noted in the art.

Thus, the present technology is directed to providing a computer-implemented method and system for analyzing files based on predictive models.

Figure 1:
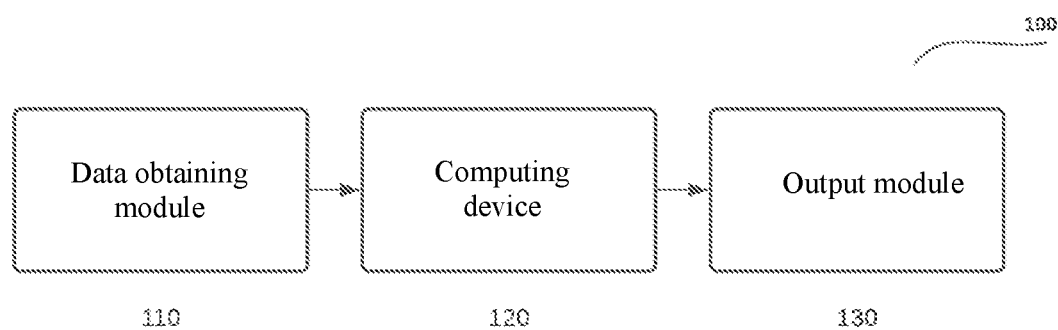
FIG. 1 illustrates a system for analyzing executable files based on of predictive models, in accordance with certain non-limiting embodiments of the present technology.

With reference to FIG. 1, there is depicted a schematic diagram of a system 100 suitable for analyzing executable files on the basis of predictive models, in accordance with certain non-limiting embodiments of the present technology. The system 100 can be configured for detecting malicious files in a non-isolated environment. According to some non-limiting embodiments of the present technology, the system 100 may comprise: a data extraction module 110 configured to extract data at least from one executable file, a computing device 120 configured to implement the present method for analyzing the executable files, and an output module 130.

According to certain non-limiting embodiments of the present technology, the present method for analyzing may include applying an ensemble of classifiers. Thus, the method described herein can be executed in two phases: (i) a training phase, during which the method is directed to training the ensemble of classifiers, which will be described below with reference to FIGS. 2 and 3; and (ii) an in-use phase, where the method is directed to applying the trained ensemble of classifiers to identify malicious executable files, which will be described further below with reference to FIG. 4.

Figure 2:
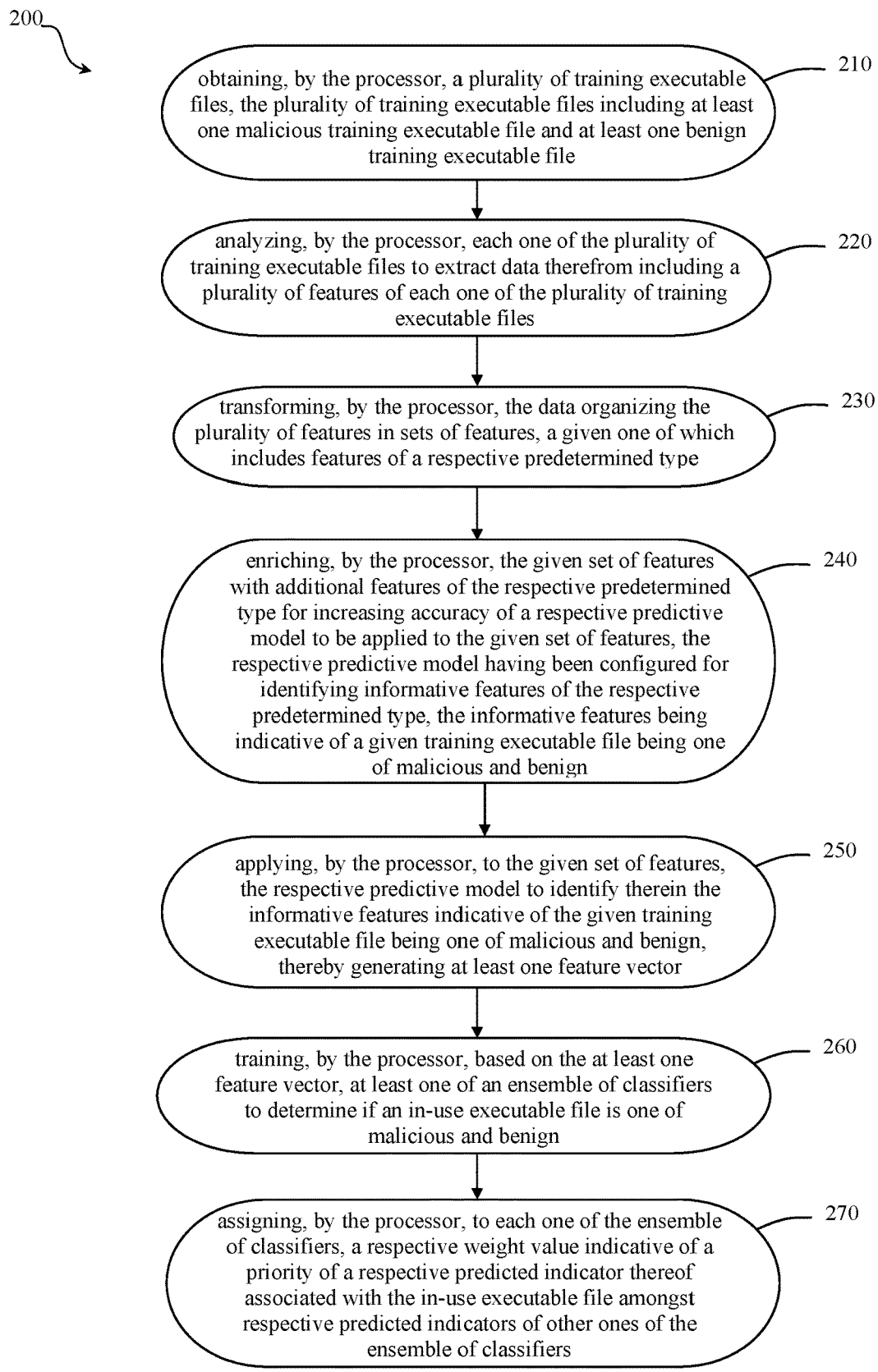
FIG. 2 illustrates a flowchart diagram of a training phase of a method for analyzing executable files based on predictive models, in accordance with certain non-limiting embodiments of the present technology.

With reference to FIG. 2, there is depicted a flowchart diagram of a training phase 200 of the present method for analyzing the executable files based on predictive models. The training phase 200 can be executed by the computing device 120, such as a computing device 500 including a processor 501 described further below with reference to FIG. 5.

Step 210: Obtaining, by the Processor, a Plurality of Training Executable Files, the Plurality of Training Executable Files Including at Least One Malicious Training Executable File and at Least One Benign Training Executable File With continued reference to FIG. 2 and with reference to FIG. 3, there is depicted a schematic diagram of a process for generating predictive models for analyzing the executable files, in accordance with certain non-limiting embodiments of the present technology. Thus, the training phase 200 begins with the processor 501 being configured to generate a sampling of files 211 comprising at least one known malicious executable file and at least one benign executable file.

As an example, but not limited thereto, the processor 501 could have access, over a communication network (the Internet, as an example, or any other intranet such as LAN or WAN, as an example), to an internal or external storage of previously collected malicious files. Also, the processor 501 can have access, over the communication network, to trusted external sources of information, such as open databases of indicators of compromise, storages of malicious files, etc.

According to certain non-limiting embodiments of the present technology, the processor 501 can be configured to generate a sampling of benign files, as an example, but not limited thereto, by installing various versions of Windows OS (Win7-32, Win7-64, Win10-64, WinServer) and further legitimate software from the following categories: instant messengers, remote video conferencing tools, office applications from different vendors, ERP and CRM systems, text editors, graphic editors, web browsers, email clients, security tools, computer games, antivirus means, virtualization means, servers (e.g. database servers, email servers).

It should be noted that further, that the processor 501 can be configured to remove files that are not suitable for analysis within the framework of the described method from the sampling of files 211 consisting of the at least one malicious file and the at least one benign executable file. Non-limiting examples of such files may be non-executable files, files of the NE format, and corrupted files.

Next, the training phase 200 proceeds to step 220.

Step 220: Analyzing, by the Processor, Each One of the Plurality of Training Executable Files to Extract Data Therefrom Including a Plurality of Features of Each One of the Plurality of Training Executable Files According to certain non-limiting embodiments of the present technology, at step 220, the processor 501 can be configured to extract from each one of the sampling of files 211 generated, by the processor 501, at step 210, data including, for a given executable file, a plurality of features.

It should be noted that the determination of features and the generation of additional features, that is, enrichment, are based on extracting from a large collection of data, most of which will typically contain an excessive amount of information, a set of informative features that will qualitatively reflect the data structure and make a positive contribution to the classification of these data.

Thus, to extract the data from at least one binary file associated with the given executable file of the sampling of files 211, the processor 501 could be configured to parse a binary file associated with a given one of the sampling of files 211 and extract data from a structure thereof. For example, the processor 501 can be configured to have access to software modules written in Python using the "pefile" and "lief" libraries required to extract the data from the structure of the given executable file. It is further worth noting that sets of different types of attributes may be obtained from the given executable file being processed.

Accordingly, the processor 501 can be configured to extract the plurality of features including attributes (215) of various types from the given executable file. As an example, but not limited thereto, such attributes may include:

dense features, which include at least numerical attributes (215), such as section sizes, file sizes in the memory, number of libraries, number of imported symbols, as well as indicators described by those skilled in malicious code analysis;

strings (216) that are all ASCII symbols present in the file;

URLs that are selected from the strings using a URL regular expression;

manifests containing the metadata of the executable file, including the file name, library versions, assembly scope, resource URL permissions, etc.;

imports that are a set of features extracted from an import table (IMAGE_DIRECTORY_ENTRY_IMPORT) associated with eth given executable file, of the following form: [library name, function group of this library, function name]. In a further embodiment, the data from the import table may be modified by adding a suspicious label as follows: [library name, function group of this library, function name, suspicious label]. A suspicious label is a mark denoting that the extracted library name frequently occurs in malware. Such a label may be extracted using a software module (parser) using a previously compiled malicious function list where the search is performed;

exports that are a set of features extracted from an export table (IMAGE_DIRECTORY_ENTRY_EXPORT) associated with the given executable, of the following form: [exported function name];

resources that are a set of features extracted from a resource catalog associated with the given executable file (IMAGE_DIRECTORY_ENTRY_RESOURCE) of the form [type, name, language];

blacklisted strings that are a set of strings that relate to suspicious strings according to those skilled in malicious code analysis, of the form [type, language];

local variables tls that refer to a table containing the description of static variables related to thread local storage (TLS). The set of features is of the following form: [addresses of arrays of callback functions (AddressOfCallBacks)]. It is worth noting that TLS is a Windows-specific method for storing data, wherein data is allocated not on the stack, but is local to program threads. As a result, each thread has its own instance of data situated in TLS.

relocations, information from the address settings table (IMAGE_DIRECTORY_ENTRY_BASERELOC) of the form [initial relative virtual address (RVA), setting type, block size in bytes].

The training phase 200 of the method thus advances to step 230.

Step 230: Transforming, by the Processor, the Data Organizing the Plurality of Features in Sets of Features, a Given One of which Includes Features of a Respective Predetermined Type Next, the processor 501 can be configured to transform the extracted data by processing it and cleaning it. It is worth noting that these steps must be performed before the dataset may be used to train a model, as the unprocessed data is often corrupted, unreliable, and may contain missing values.

Thus, the processor 501 can be configured to process the data including the plurality of features associated with the given one of the sampling of files 211 obtained at the previous step by executing at least one of the following:

cleaning the data, the cleaning including filling missing values, detecting and removing data noise and outliers;

transforming the data, in particular: normalizing data to reduce the dimensionality of feature space and bring features to a certain predetermined range of values;

compacting the data: creating a sampling of data or attributes to simplify data processing;

sampling the data: transforming continuous attributes into categorical ones for ease of use of some machine learning methods;

cleaning text: removing some symbols that may cause data noise or change the coding standard.

It is worth noting that the processor 501 can be configured to process the data of each of the various type described above using a corresponding processing method as follows: one for numbers, another one for strings, etc.

For example, the processor 501 can be configured to use at least the following methods for processing numerical values:

removal, which is the simplest and most resource-intensive method, wherein an entire record with a missing value is removed;

dummy substitution, which is replacing missing values with dummy ones, for example, replacing categorical data with an "unknown" value or replacing numbers with 0;

mean substitution, which implies that missing numerical data may be replaced with the mean value for the present data;

frequently used value substitution, which means replacing missing categorical values with the most frequently used elements;

regression substitution, which is usage of a regression method to replace missing values with regression ones, that is, regression coefficients are calculated based on observations that do not contain missing data, and then they are used to restore the missing value of the dependent variable; and maximum likelihood estimation (MLE) method, where all unknown data that needs to be restored is collated in such a way that it matches as best as possible with that already available in the database.

Next, the data of the obtained sampling is normalized, which allows the numerical values to be scaled in the required ranges. It is worth noting that dimensionality reduction or normalization speeds up training of the model, and in most cases filters out some noise and unnecessary detail, thereby providing better performance. Further, the data is normalized using at least the following methods:

Z-scaling, which is scaling of data on the basis of a mean value and standard deviation:

dividing the difference between the data and its mean by the standard deviation;

linear scaling, which is a linear transformation of data into a range, for example, from 0 to 1, where the minimum and maximum scaled values correspond to 0 and 1, respectively.

As an example, but not limited thereto, the processor 501 can be configured to use principal component analysis (PCA) to reduce the dimensionality of the feature data space. This method identifies the hyperplane that is closest to the data and then projects this data onto same. Further, it should be noted that before the training set may be projected onto the hyperplane with the smallest number of dimensions, the correct hyperplane must be selected. Thus, after identifying all the principal components, it might be possible to reduce the dimensionality of the dataset to d dimensions by projecting same onto the hyperplane defined by the first d principal components. It should be further noted that this approach to the selection of the hyperplane ensures that the projection will provide the maximum possible variance and retain the informational value of the transformed data.

Further, to process the obtained data, the processor 501 can be configured to process text and categorical attributes, since most machine learning algorithms are trained specifically based on numerical data.

Accordingly, by way of example, and not as a limitation, to transform text data into numbers, the processor 501 can be configured to use at least one of the following techniques:

label encoding by mapping each category to a unique integer;

one-hot encoding such that only one attribute is 1 (active) while the others are 0 (passive). For example, if a string contains a predetermined word, then its attribute will be equal to 1. One attribute is equal to one only when the string in question contains the word "red", and if this word is not present in the string, then the attribute will be equal to 0. Another attribute will be 1 when the category string contains the word "green" (otherwise it will be 0), etc.;

vectorization using the TF-IDF (Term Frequency-Inverse Document Frequency Vectorizer) algorithm, which is used in cases where categorizing text documents is performed, since the method enables determining the importance of a word for a given document relative to other documents. That is, if a term is frequently used in a certain text, but rarely used in others, then it has great significance for this text and a lot of weight in the resulting vector. If the term is present frequently enough in all documents from the set, then, after processing, the importance of such a term will be insignificant.

The training phase 200 thus proceeds to step 240.

Step 240: Enriching, by the Processor, the Given Set of Features with Additional Features of the Respective Predetermined Type for Increasing Accuracy of a Respective Predictive Model to be Applied to the Given Set of Features, the Respective Predictive Model Having been Configured for Identifying Informative Features of the Respective Predetermined Type, the Informative Features being Indicative of a Given Training Executable File being One of Malicious and Benign According to certain non-limiting embodiments of the present technology, at step 240, the processor 501 can be configured to enrich each set of features of a respective ones of the various types described above with additional features.

Broadly speaking, data enrichment refers to the process of saturating data with new information, which makes it more valuable and meaningful for analysis. The available data is enriched with external data from reliable sources, for example, databases of indicators of compromise having been previously identified by specialists in malicious code analysis, lists of names of function libraries that are frequently used in malicious code, etc.

By enriching each set of features of the respective predetermined type of data, the processor 501 could be thus configured to increase accuracy of a respective predictive model to be applied thereto for identifying informative features of the given executable file being one of malicious or benign.

The training phase hence advances to step 250.

Step 250: Applying, by the Processor, to the Given Set of Features, the Respective Predictive Model to Identify Therein the Informative Features Indicative of the Given Training Executable File being One of Malicious and Benign, Thereby Generating at Least One Feature Vector At step 250, according to certain non-limiting embodiments of the present technology, the processor 501 can be configured to determine informative features specific to benign files or, alternately, malicious files by applying predictive models for each set of features of the respective predetermined data type as described above.

Figure 3:
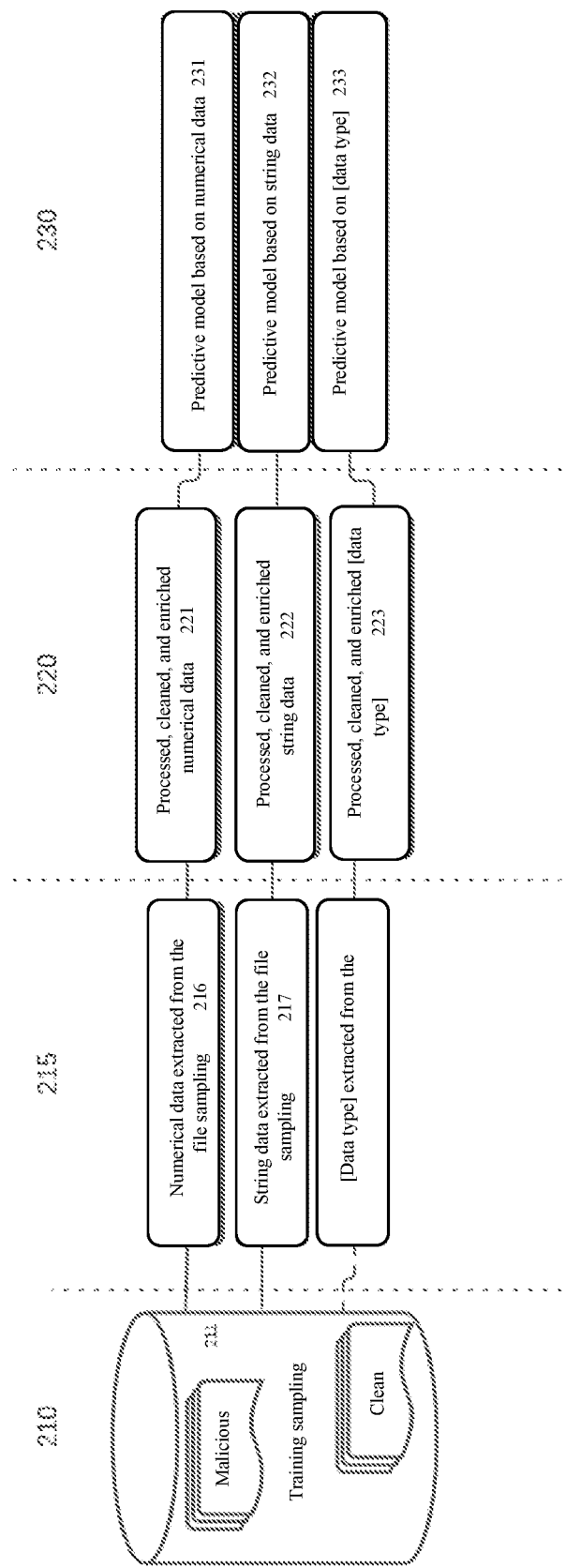
FIG. 3 illustrates a schematic diagram of a process for generation of predictive models based on various types of extracted data of predictive models, in accordance with certain non-limiting embodiments of the present technology.

It should be noted with reference to FIG. 3, as an example, but not limited thereto, that the predictive models for each type of data that may be generated, by the processor 501, in the executable file at this step. That is, at the previous steps 210, the sampling of files (both malicious and benign) 211 is prepared; at the sub-step 215 the data including the plurality of features from each file of the sampling of files 211 is organized into set of features, each of which includes features of the respective predetermined type of features as described above, for example, numerical data (216), string data (217), and any other data types extracted from the files of the sampling (218), and thereafter, at step 230 and 240, the sets of features are analyzed such that processed, cleaned, and enriched as described above, and respective feature vectors are generated (221, 222, 223), and at step 250, predictive models are generated based on the obtained vectors (231, 232, 233) to identify the features specific to clean or malicious files.

Thus, the processor 501 can be configured to apply each predictive model configured to analyze features of the respective predetermined type to respective sets of features to determine and label which features are specific to benign files, that is, legitimate software, or, alternately, malicious files. For example, a given predictive model may determine that malicious and legitimate files have very different parameters such as entropy mean of all sections, the proportion of sections with standard names in the total number of sections, and the standard deviation of the entropy of sections of a certain type.

Thus, a predictive model to determine the most informative features of numerical data attributes is built by the processor 501.

According to certain non-limiting embodiments of the present technology, the numerical data attributes obtained for building the given predictive model may include, but are not limited to, at least the following attributes shown in Table 1.

TABLE 1

| Attribute | Description |
| --- | --- |
| check_sum | File checksum |
| compile_date | Compile date |
| debug_size | Debugging information directory size |
| export_size | Export table size |
| iat_rva | Import table RVA |
| major_version | Major digit in the assembler version number |
| minor_version | Minor digit in the version number of a given file |
| number_of_imports | Number of imported libraries |
| number_of_import_symbols | Number of imported symbols |
| number_of_export_ symbols | Number of exported symbols (typically those of subprograms and variables from dll libraries) |
| number_of_bound_import_symbols | Number of symbols in the static bound import table |
| number_of_bound_imports | Number of libraries in the bound import table |
| number_of_rva_and_sizes | Number of descriptors and data catalogs. |
| number_of_sections | Number of sections |

TABLE 1-continued

| Attribute | Description |
|---|---|
| total_size_pe | Physical size of a binary PE file |
| virtual_address | RVA of the first section in the memory |
| virtual_size | Size of the 1st section in the memory |
| virtual_size_2 | Size of the 2nd section in the memory |
| datadir_IMAGE_DIRECTORY_ENTRY_BASERELOC_size | Physical size of the address settings table |
| datadir_IMAGE_DIRECTORY_ENTRY_RESOURCE_size | Physical size of the resource table |
| datadir_IMAGE_DIRECTORY_ENTRY_IAT_size | Physical size of the imports address table (IAT) |
| datadir_IMAGE_DIRECTORY_ENTRY_IMPORT_size | Physical size of the imports table |
| datadir_IMAGE_DIRECTORY_ENTRY_EXPORT_size | Physical size of the exports table |
| pe_char | File attributes |
| pe_dll | Library file (1 or 0) |
| pe_driver | Driver file (1 or 0) |
| pe_exe | File extension .exe (1 or 0) |
| pe_i386 | I386 processor (1 or 0) |
| pe_majorlink | Major digit in the assembler version number |
| pe_minorlink | Minor digit in the assembler version number |
| size_code | The sum of the sizes of all sections with the program code |
| size_image | File size in memory, including all headers |
| size_initdata | The sum of the sizes of all sections containing initialized data |
| size_uninit | The sum of the sizes of all sections containing uninitialized data |

To improve the accuracy of the selection of specific features, in addition to the above standard features extracted from a binary file, further features may be generated, that is enriched, and obtained by examining PE files; further, it should be noted that the examination of PE-files may be carried out by both automated systems and human analysts. Thus, said enriching features may include, in at least some non-limiting embodiments of the present technology, at least the features that are presented in Table 2.

TABLE 2

| Feature | Description |
|---|---|
| std_sections_names | The fact that all section names are standard (.text, .data, .bss, .reloc, .rsrc, etc.) |
| generated_check_sum | Generated checksum |
| entropy_sec_mean | Entropy mean for all sections |
| entropy_sec_std | Standard deviation of entropy of all sections |
| sec_entropy_* | Entropy of standard sections (* is replaced with a name, for example, sec_entropy_text) |
| known_sections_number | Number of sections with standard names (.text, . data, .bss, .reloc, .rsrc, etc.) |
| unknown_sections_number | Number of sections with non-standard names |
| known_sections_pr | Ratio of sections with standard names to the total number of sections |
| unknown_sections_pr | Ratio of sections with non-standard names to the total number of sections |
| *_entropy_sec_mean | Mean entropy of sections of a certain type (for example, sections into which MEM_WRITE may be written or sections containing executable code CNT_CODE) |
| *_entropy_sec_std | Standard deviation of entropy of sections of a particular type |
| rawsize_sec_mean | Average size of all sections in the file |
| vasize_sec_mean | Average size of all sections when loaded into RAM |

Further, for a better and more complete selection of the informative features, the processor 501 can be configured to retrieve (for example, form an external database) and add indicators of compromise having been identified by specialists in malicious code analysis.

In some non-limiting embodiments of the present technology, such indicators include, as an example, but not limited thereto, at least the following:
Digital certificate is used which is not valid.
Entrypoint is in section <.section_name> which is not executable.
Entrypoint is in the last section.
The age of the debug file is suspicious.
The count of imports is suspicious.
The debug file name extension is suspicious.
The dos-stub is missing.
The executable file contains some default passwords.
The file has a lot of executable sections.
The executable file has sections that are both executable and writable.
The file has been compiled with Delphi.
The file has section names that are present in pre-black-listed section names.
The file has no manifest.

The file ignores Address Space Layout Randomization (ASLR).
The file ignores Data Execution Prevention (DEP).
The file ignores Structured Exception Handling (SEH).
The file ignores cookies on the stack (GS).
The file implements Control Flow Guard (CFG).
The file imports suspicious number of anti-debug function(s).
The file is a Device Driver.
The file is code-less.
The file is resource-less.
The file opts for Address Space Layout Randomization (ASLR).
The file opts for Data Execution Prevention (DEP).
The file opts for cookies on the stack (GS).
The file references a debug symbols file.
The file references keyboard functions.
The file references keyboard keys like a Keylogger.
The file-ratio of the resources is suspicious.
The first section is writable.
The last section is executable.
The shared section(s) reached the max threshold.
The size of code is bigger than the size of code sections.
The size of initialized data reached the max threshold.
The size of the optional-header is suspicious.
The value of 'SizeOfImage' is suspicious.

Based on the above, the predictive model for identifying the informative features, that is, most valuable ones, specific to malicious executable files or, alternately, benign files must be trained at least on the data obtained from the analysis of the binary file, as well as on the generated further additional features obtained after examining PE files, together with indicators of compromise described by those skilled in malicious code analysis.

The second predictive model, which identifies informative strings specific to malicious or, alternately, benign files, is built on the basis of ASCII strings.

To build the second predictive model on the basis of ASCII strings, the processor 501 can be configured to execute the following steps:
  extracting strings from different areas of a binary ASCII file and collecting same in a single array;
  concatenating all strings from the array, which are separated by a space, into a single string;
  compiling a vector, that is, a set of such strings for the entire training sampling;
  processing the strings using the tf-idf algorithm described earlier using the English "stopwords" dictionary and pruning. For example, 5,000 most informative strings are left. This is done so as to remove noise and speed up the training of the model, since the number of strings in binary files often reaches 100,000 or more;
  transferring the set of features with appropriate weights (set by the tf-idf algorithm) to the classifier. As an example, but not limited thereto, the Random Forest classifier from the scikit-learn library may be used.

As an example, but not limited thereto: after determining the informative features in the string data, the processor 501 can be configured to determine that one of the most informative strings is the "pdb" string. The presence of said string in an executable file typically means that there is further a database file in the pdb format associated with said executable file. The files of this format are typically used to store debug information about the program. The presence of such files clearly indicates that the corresponding executable file is most likely benign and not malicious. PDB files are rarely present in malicious software (malware), as malware typically aims at exactly the opposite, i.e., to exhibit as little information about itself as possible.

Thus, by training the second predictive model, the processor 501 can be configured to determine the informative string features for each type of software, which are then combined into a feature vector for further training of the string classifier. Non-limiting examples of identified strings are shown in Table 3.

TABLE 3

| Malicious Software | Benign Software |
|---|---|
| exitprocess, loadlibrarya, getmodulehandlea, gdi32, mg, findfirstfilea, virtualalloc, qa, virtualfree, createfilea, form, aw, kz, ao, lv, getcommandlinea, aj, rtlunwind, vb, qe, fn, vi, ke, sf, createprocessa, jl, jq, setfilepointer, lp, ia, dz, eb, yn, kg, messageboxa, getstartupinfoa, getforegroundwindow, gn, ma, p7, deletefilea, svwuj, fs, wsprintfa, suvw, ar, hn, wininet, kk, jb, og, fw, wc, ec, yp, jg, sn, nz, nm, dispatchmessagea, ow, getcpinfo, lstrcpya, regsetvalueexa, getfileattributesa, getwindowtexta, uj, mw, wa, gettemppatha, 7o, kj, i\_, setwindowpos, yo, cb, yx, yg, defwindowproca, fv, qc, nx, qz, bg, ov, nt, gq, zb, jo, xg, comctl32, wq, ki, ox, zw, nq, i7, lb, cz, o2, 6p, qg, postquitmessage, nn, ea, sendmessagea, vv, cr, z\_, bk, fz, pppppppp, setstdhandle, getsystemdirectorya, createwindowexa, qk, mt, ga, nc, mp, interlockeddecrement, lstrlena, iswindowenabled, bo, vo, kw, qb, er, oe, ns, ze, ne, 700wp, lstrcmpia, ez, nk, wi, hy, onpf, managed\_vector\_copy\_constructor\_iterator, wn, wy, em, h6, nv, yz, qo, ek, wo, vector\_deleting\_destructor, za, nw, \_ptr64, 6z, bj, uqpxy, settimer, sy, cg, wk, fgiu, f3, zp, sssss, je, uq, d2, sd, beginpaint, yq, ng, ym, ka, \_pascal, wb, interlockedincrement, findnextfilea, placement\_delete, getdc, dynamic\_initializer\_for\_, opc, lz, getlastactivepopup | pdb, zzzdbg, rsa1, \_initterm, \_amsg\_exit, \_cordllmain, rsds, module, guid, crt, rtllookupfunctionentry, blob, memset, lsystem, xca, idata, edata, bsjb, malloc, \_culture, core, \_unlock, neutral, gctl, api, 00cfg, rdata, rtlvirtualunwind, bss, \_mscorlib, \_purecall, rtlcapturecontext, \_except\_handler4\_common, resources, b77a5c561934e089, xdata, \_a\_a, xia, gfids, win, \_lock, brc, disablethreadlibrarycalls, \_cxxframehandler3, \_vsnwprintf, memcpy, 0e3, microsoft\_corporation, resourcereader, a\_a, mscoree, uvwatauavawh, xiz, uvwh, terminate, watauavawh, \_microsoft\_corporation, runtimeresourceset, xe3, \_e3, 0a\_a, dllgetclassobject, lca, pdata, \_initterm\_e, 8e3, pa\_a, yaxxz, xcz, fd9, \_c\_specific\_handler, dllcanunloadnow, \_xcptfilter, processthreads, pe3, assemblyproductattribute, assemblyfileversionattribute, \_watauavawh, debuggableattribute, padpadp, memmove, \_uvwatauavawh, \_wcsicmp, \_cxxthrowexception, runtime, debuggingmodes, ilist, libraryloader, xcu, \_copyright\_, ha\_a, \_h3e\_h3e, assemblycopyrightattribute, svwatauavawh, uatauavawh, usvwatauavawh, xiaa |

Similarly to the feature types described above, the processor 501 can further be configured to generate an other predictive model to detect malware based on an attribute containing information about URLs stored among other ASCII strings extracted from a binary file. The only difference between the building this predictive model and the previous one will be the fact that the tf-idf algorithm analyzes not words, but symbol 5-grams.

To obtain symbol 5-grams, in some non-limiting embodiments of the present technology, the processor 501 can be configured to split each URL found (for example, from a crawling database) into fragments of five symbols each. If the final fragment after splitting is shorter than five symbols, then it is padded with spaces to five. For example, a URL such as microsoft.com/page.html will be transformed into the following 5-gram set: 'micro', 'soft', 'com/p', 'age.h', 'tml'.

Table 4 below shows an example of a 5-gram set specific to malicious software, and to legitimate or benign software.

TABLE 4

| Malicious Software | Benign Software |
|---|---|
| '/', 'fc/co', '.php', 'f.net', 'okie_', 's.sf.', 'ec.ht', 'nsis', '/rfc', 'cURL', '.net', 'haxx.', 's_err', 'x.se', '/nsi', 'sis.s', 'is_er', '.haxx', 'ookie', '_erro', 'e_spe', 'sis_e', '/cook', 'rror', 'c.htm', '_spec', 'cURL.', 'ie_sp', 'is.sf', 'URL.h', 'c/coo', 'l.hax', 'bsens', 'spec.', 'sf.ne', 'rfc/c', 'nsis_', 'nsis.', 'www.i', 'pec.h', '%s', '.sf.n', 'rl.ha', '/nsis', 'error', 'ftwar', 'oftwa', 'xx.se', 'tware', 'gnlog', 'ware.', 'axx.s', 'ww.go', 'ww.ib', 'erts/', 're.co', 'ogle.', 'le.co', '/%s', 'kie_s', '.goog', 'e.php', '.ibse', 'w.ibs', 'oogle', '/inde', '/pki', '.crl0', 'ndex.', 'i/crl', 'gle.c', 'ensof', 'te.ph', 'index', 'lp/in', 'softw', 'gin.r', 'crl.', 'a.com', 'in.ru', '%s:80', '%s:8', 'pki/c', 'are.o', 'jrsof', , 'googl', 'ownth', 'c.com', '.crt0', '%s:%d', '/ishe', '/rfc/', 'ate.p', 'are.c', 's:80', 'n.ru', 'dmin/', 'raut_', 'arch.', 'that.', 'senso', 'elp/i', 'w.goo', 'cerau', 'ishel', 'butt', 'rl/pr', 'at.co', '%s:%', 'cooki', 'gate.', '.exe', 'nthat', 'll/ga', 's/mic', '-06-2', 'ibsen', 'i2.t', 'rsoft', 'gnlo' | 'oft.c', 'icros', '.micr', 'croso', 'ft.co', 'osoft', 'rosof', 'micro', 'emas.', 'go.mi', '/fwl', 'go.m', 'fwlin', 'hema', 'wlink', 'mas.m', '/fwli', '/200', 'ation', 's.mic', 'link/', 'ink/', 'as.mi', 'o.mic', 'hemas', 'hub.c', '.com)', 'sche', '/xml/', 'ithub', 'githu', '/winf', 'pport', 'names', '', 'thub.', 'xamar', 'nfx/2', 'l/199', '/xmls', '/dot', '/1998', '2000/', 'amesp', 'otnet', '/core', 'loca', 'fx/20', 'xmlsc', 'mlsch', 'mespa', 'marin', '/xaml', 'ml/19', 'host', 'w.xam', '/2001', 'x/200', 'ocalh', 'com)', 'xml/1', 'senta', 'ub.co', 'calho', '/xml', '01/xm', 'trans', 'gith', 'in.co', '.xama', 'ww.xa', 'uppor', 'dotne', 'lhost', '/2000', 'espac', '006/x', '8/nam', 'refx/', 'p.org', '2001/', 'amari', '98/na', 'xaml', 'alhos', 'a.ms', 'prese', '1/xml', 'tree/', '/pres', '.avir', 'resen', 'local', 'rin.c', 'vira.', 'lsche', 'aka.m', 'nses/', '001/x', 'orefx', 'suppo', '/dotn', 'aka.', '06/xa', 'licen', 't/cor', 'cense', 'es/gp', |

Also, in additional non-limiting embodiments of the present technology, the processor 501 could be configured to build at least one predictive model based on categorical attributes.

Thus, in the case where each attribute is a characteristic of a particular category, the processor 501 could further be configured to encode the set of attributes of each category using the one-hot encoding technique. This will produce a feature vector consisting of a sequence of 0 and 1, wherein the vector includes 1 if the attribute is present in the file and 0 if not.

According to certain non-limiting embodiments of the present technology, to build the predictive model based on categorical attributes, the processor 501 can be configured to execute the following steps:

extracting sets of features from the resource table: library names, groups of library functions (if the group is unknown, the value is set to "undefined"), names of imported functions. At this step, the extracted data may be further enriched, for example, if the name of a certain imported function is present in a previously compiled list of functions specific to malware, then the function will be further marked as belonging to suspicious functions;

sorting each feature by pluralities of feature types and including same into the corresponding vector;

encoding vectors with feature sets using the one-hot encoding technique such that each element of the vector encodes an attribute in itself, said element comprising a number indicating the frequency at which said attribute occurred in the file. This may be done, for example, by means of a pre-trained "OneHotEncoder" class from the "scikit-learn" library;

reducing the dimensionality of feature space using the PCA algorithm, while leaving at least 99% of the initial variance to get rid of unnecessary noise in the sampling, increase the speed of training of the classifier, and reduce the memory footprint;

next, transferring the training dataset with reduced feature space to a classifier, such as "Random Forest" classifier from the "scikit-learn" library.

Further, in further non-limiting embodiments of the present technology, at least the following predictive models may be built: those on the basis of manifests, those on the basis of import and export tables, those on the basis of data from resource catalogs, those on the basis of information from the thread local memory, those on the basis of address settings table, and also those on the basis of suspicious lines, checked against a pre-prepared "blacklist".

To train the given predictive model on the basis of suspicious strings, vectors compiled according to the strings from the pre-prepared "blacklist" of suspicious strings, and initially comprising zero values in all elements, are generated. Next, in the course of the above analysis of ASCII strings, all the strings extracted from the file are checked against this list; if any string is found in the "blacklist", the corresponding vector element is assigned the value 1. Thus, at the end of the analysis, the vectors will contain information on the presence of any suspicious strings from the list in the file being analyzed.

After building each of the predictive models for a certain type of data extracted from a binary file, a list of the most informative features is obtained, which characterizes with high accuracy whether the file in question is malicious or benign.

Further, in some non-limiting embodiments of the present technology, the processor 501 can be configured to combine the so identified informative features, from the given set of features of the respective predetermined type, indicative of whether the given executable file being one of malicious and benign, into a respective feature vector. For example, the first feature vector may thus include the type of numerical data attributes, the second vector may include the type of string data, the third vector may include URL information, the fourth vector may include categorical attributes, the fifth vector is based on manifests, the sixth and seventh vectors are based on import and export tables, respectively, the eighth vector is based on data from resource catalogs, the ninth vector is based on information from the thread local memory, the tenth vector is based on the address settings table, the eleventh vector is based on blacklisted suspicious strings.

As an example, but not limited thereto, the processor 501 can be configured to build a numerical feature vector as follows: each element of the vector (cell) has its own assignment corresponding to a predetermined attribute.

For example:
1st cell—known_sections_number=10 (number of known sections);
2nd cell—unknown_sections_pr=0.93 (ratio of unknown sections to the total number);
3rd cell—some_section_lines_number=505 (number of lines in a section);
. . . .
n−1 cell—lines_number=5623 (number of code lines in a disassembled file);
n cell—file_size=10893 (file size in bytes).

Further, it should be noted that the total length of the respective feature vector may vary as it depends on the number of the informative features detected using the respective predictive model at the previous step.

The training phase thus proceeds to step 260.

Step 260: Training, by the Processor, Based on the at Least One Feature Vector, at Least One of an Ensemble of Classifiers to Determine if an In-Use Executable File is One of Malicious and Benign Thus, at step 260, according to certain non-limiting embodiments of the present technology, based on the respective feature vector including features of the respective predetermined type as described above, the processor 501 can be configured to train at least one classifier for the data of the respective predetermined type. Thus, the processor 501 can be configured to train the ensemble of classifiers, each one of which is configured for a different predetermined type of data.

Further, in additional non-limiting embodiments of the present technology, the processor 501 can be configured to assess the quality of each one of the classifiers trained at the previous step in order to determine a decision priority therefor.

Accordingly, the quality of at least one trained classifier is then checked against a certain type of data by the processor 501 having been configured to apply the method of cross validation (K-fold validation) on at least five blocks.

In the context of the present specification, cross-validation is a model validation technique to verify how well a model's statistical analysis and training attribute set can work on an independent dataset. Typically, cross-validation is used in cases where prediction is desired, and where it is desired to assess how the predictive model is able to work in practice. One K-fold cross-validation cycle involves splitting the dataset into chunks, followed by building the model on the basis of a single chunk (referred to as a training set), and validating the model on the basis of another chunk (referred to as a test set). To reduce the scatter of results, different cross-validation cycles are performed with different partitioning, and the validation results are averaged over all cycles.

Further, as an example, by implementing the above technique, the processor 501 can be configured to include in the informative features, in addition to numerical features, at least the following indicators:
The file ignores address space layout randomization (ASLR),
The file references the debug symbols file,
The file opts for Data Execution Prevention (DEP),
The file opts for address space layout randomization (ASLR),
Suspicious debug file name extension,
The file ignores Data Execution Prevention (DEP).

The training phase 200 hence advances to step 270.

Step 270: Assigning, by the Processor, to Each One of the Ensemble of Classifiers, a Respective Weight Value Indicative of a Priority of a Respective Predicted Indicator Thereof Associated with the In-Use Executable File Amongst Respective Predicted Indicators of Other Ones of the Ensemble of Classifiers According to certain non-limiting embodiments of the present technology, to determine a prediction of the ensemble of classifiers, the processor 501 can be configured to aggregate predictions of all classifiers separately and average their predictions to determine if a given in-use executable file is one of malicious and benign.

It should be noted that such a technique is known in the art and is referred to as a soft voting classifier. This ensemble approach is typically more effective than "hard voting,"

which opts for the hard voting classifier as it gives more weight to votes from the high confidence classifiers.

Next, to assess the quality of each classifier included in the ensemble of classifiers, the processor 501 can be configured to consider the fact that, when working with real data, the classifiers will encounter mostly benign files. Thus, first of all, it is necessary to establish completeness in relation to the class of benign files, that is, to avoid type I errors (false positives—falsely classified benign executable files). On the other hand, type II error (missed target—falsely classified malicious executable files) will be selected as the second parameter in the final metric. The above provides a function (1), which is a combination of type I and type II errors.

Thus, the formula for the error minimization function, where the coefficients were selected experimentally, may, in this non-limiting example, be as follows:

$$0.8\frac{FP}{TN+FP}+0.2\frac{FN}{TP+FN}\to \min, \quad (1)$$

where
where TN is a number of correctly classified benign executable files,
FP is a number of falsely classified benign executable files (type I error),
TP is a number of correctly classified malicious executable files, and
FN is a number of falsely classified malicious executable files (type II error).

Thus, according to certain non-limiting embodiments of the present technology, the processor 501 can be configured to determine and assign respective weight values to each one of the ensemble of classifiers as being inversely proportional to the value of the loss function achieved at the step of classifier validation and further normalized such that the sum of the weights of all classifiers in the ensemble of classifiers is equal to 1.

As an example, but not limited thereto, for each one of the ensemble of classifiers configured for the respective predetermined type of data, the processor 501 can be configured to determine the following weight values:

| | |
|---|---|
| Dense features | 0.1443 |
| strings | 0.1355 |
| URLs | 0.0990 |
| resources | 0.1152 |
| imports | 0.1233 |
| manifests | 0.0744 |
| relocations | 0.0965 |
| blacklisted strings | 0.0772 |
| local variables tls | 0.1345 |

Further, it should be noted that the processor 501 can be configured to determine respective weight values of each one of the ensemble of classifiers indicated in the table above experimentally, during validation, such as in accordance with equation (1) based on another sampling of files that does not take part in the training of the classifiers.

It should be noted that in case of refusal to classify any model (for example, refusal to classify the URL model caused by the fact that there were no URLs in the PE file), the processor 501 will not consider the respective classifier in verdict-making.

The training phase 200 hence terminates.

Thus, having trained the ensemble of classifiers to detect malicious executable files based on specific features as described above, the processor 501 can further be configured to use the so trained ensemble of classifiers on in-use executable files.

Figure 4:
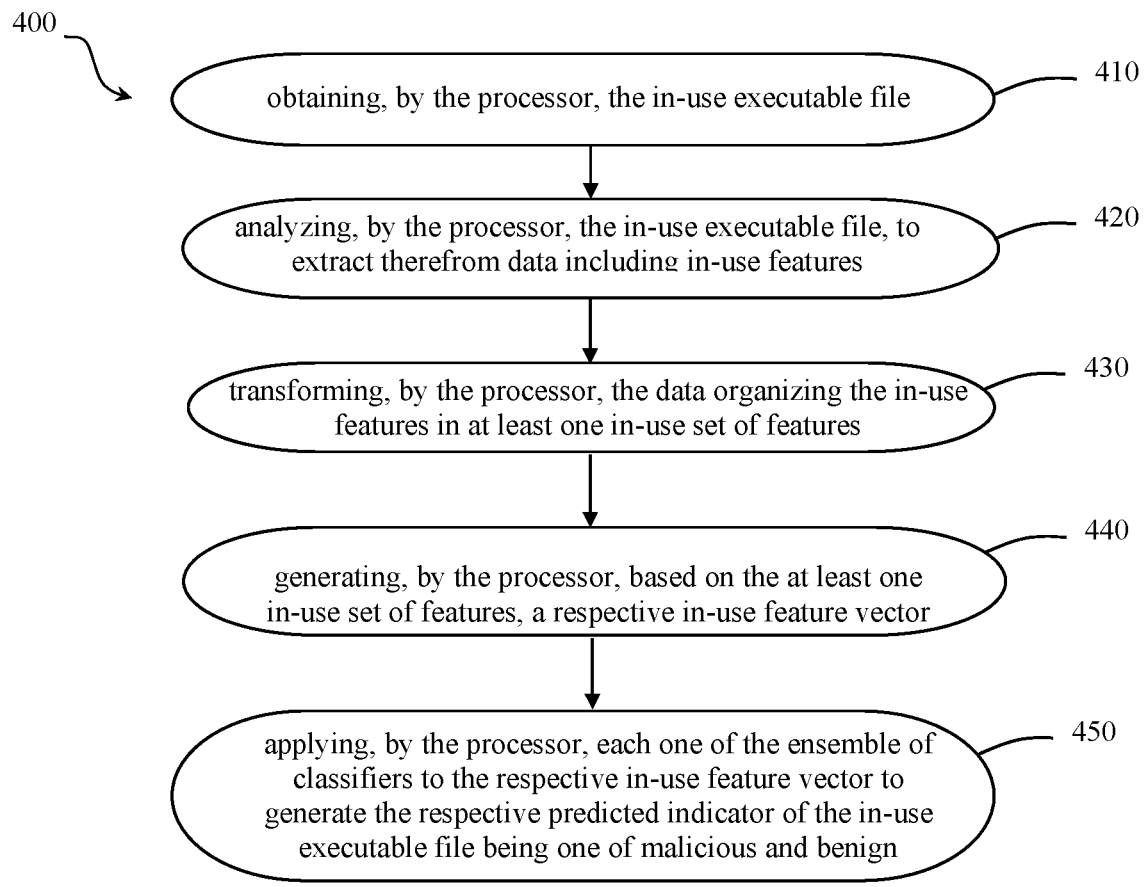
FIG. 4 illustrates a flowchart diagram of an in-use phase of the method for analyzing executable files based on predictive models, in accordance with certain non-limiting embodiments of the present technology.

With reference to FIG. 4, there is depicted a flowchart diagram of an in-use phase 400 of the present method for static analysis of executable files, in accordance with certain non-limiting embodiments of the present technology. It is worth noting that the in-use phase is executed without launching the in-use executable files being analyzed. Akin to the training phase 200, the in-use phase 400 can be executed by the processor 501 of the computing device 500.

Step 410: Obtaining, by the Processor, the In-Use Executable File

At step 410, according to certain non-limiting embodiments of the present technology, the processor 501 can be configured to receive the given in-use executable file from one of the internal database, the external database, from the communication network, a portable computer-readable medium, and the like.

The in-use phase thus proceeds to step 420.

Step 420: Analyzing, by the Processor, the In-Use Executable File, to Extract Therefrom Data Including In-Use Features At step 410, the processor 501 can be configured to analyze the given in-use executable file. This step may be executed similar to step 220 of the training phase 200 as described above.

Accordingly, by means of the data extraction module (110) shown in FIG. 1, the processor 501 can be configured to extract data from the given in-use executable file including in-use features associated therewith.

The in-use phase 400 hence advances to step 430.

Step 430: Transforming, by the Processor, the Data Organizing the In-Use Features in at Least One In-Use Set of Features Further, at step 430, the processor 501 can be configured to organize the in-use features according to their respective types (for example, numerical data, string data), clean noise and process in accordance with the algorithms that have been described above in relation to steps 230 the training phase 200, respectively.

The in-use phase 400 thus advances to step 440.

Step 440: Generating, by the Processor, Based on the at Least One in-Use Set of Features, a Respective In-Use Feature Vector At this step, based on the extracted in-use features associated with the given in-use executable file, the processor 501 can be configured to generate at least one in-use feature vector of the respective predetermined type.

It is further worth noting that a number of vectors can be equal to the number of various data types present in the given in-use executable file in question.

The in-use phase 400 hence proceeds to step 450.

Step 450: Applying, by the Processor, Each One of the Ensemble of Classifiers to the Respective In-Use Feature Vector to Generate the Respective Predicted Indicator of the In-Use Executable File being One of Malicious and Benign At step 450, the processor 501 can be configured to apply the ensemble of classifiers trained during the training phase 200.

Further, the processor 501 can be configured to receive an output of the ensemble of classifiers and generate an analysis report having one of the following forms For example, in some non-limiting embodiments of the present technology, the processor 501 can be configured to generate a detailed result when the decision of each classifier in the ensemble is shown. Such type of display may be useful for further manual analysis of the file by an analyst. Further, various approaches are possible as follows:
- a) each classifier assesses file maliciousness and expresses it as a number in the range from 0 to 1 (for example, 0.89); wherein if nothing has been found for a given type of data in the given in-use executable file in question, the value −1 will be output.
- b) each classifier yields a final verdict based on an internal decision threshold. That is, as an example, but not limited thereto, if the threshold value is set equal to 0.8 and the assessment result is equal to 0.9, the classifier will yield the "malicious" verdict, whereas if the result is equal to 0.5, it will yield the "benign" verdict. If nothing was found for this field during file analysis, the "unknown" verdict will be yielded.

In other non-limiting embodiments of the present technology, the processor 501 can be configured to generate a complex result, when the verdict of each classifier makes a certain contribution to the overall result of the entire ensemble. Further, the overall result may further be expressed as follows:
- a) by a numerical estimate of the maliciousness of the file in question, for example, expressed as a number ranging from 0 to 1, where 0 means absolute confidence in that the given in-use executable file is benign, and 1 means absolute confidence in that the file is malicious.
- b) by a categorical verdict, which may look as "malicious" if the ensemble of classifiers has a result exceeding a predetermined threshold (for example, more than 0.5), or as "benign" if the result is less than or equal to the threshold value. It should be noted that in this case the "unknown" verdict is not yielded if the ensemble contains the "dense features" classifier, which always produces a result. In the absence of such a classifier, the "unknown" verdict may, similarly to the previous case, be yielded if the analysis did not reveal any data corresponding to the types of classifiers used in the ensemble.

Furthermore, in additional non-limiting embodiments of the present technology, the processor 501 can be configured to output the analysis result on the given in-use executable file to a user.

The in-use phase 400 hence terminates.

Computing Environment

Figure 5:
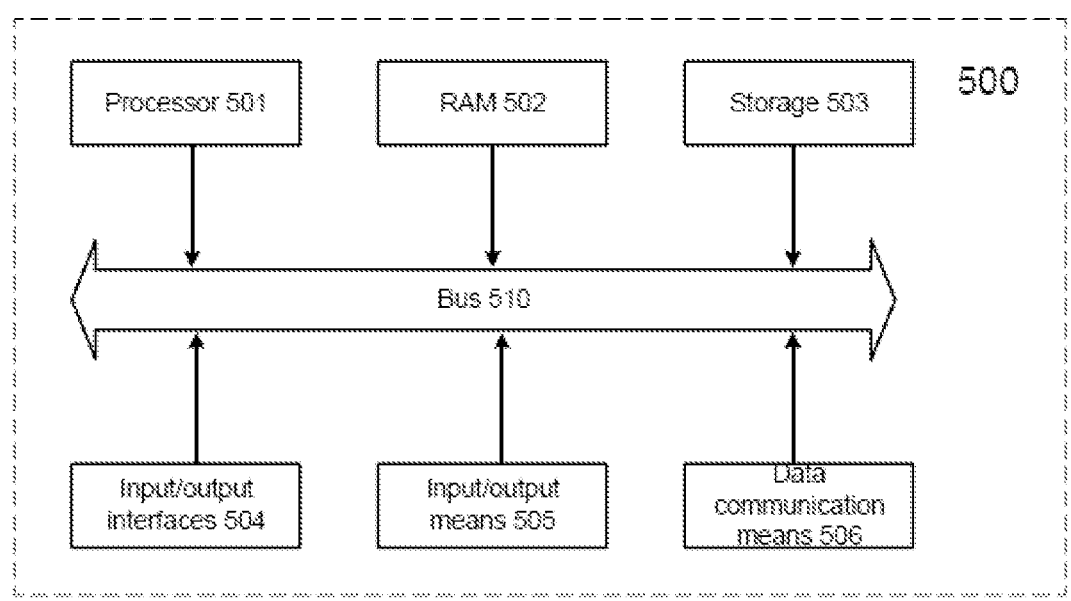
FIG. 5 illustrates a schematic diagram of an example computing environment configurable for execution of both the training phase and in-use phase of the method for analyzing executable files based on predictive models of FIGS. 2 and 4, respectively, in accordance with certain non-limiting embodiments of the present technology.

With reference to FIG. 5, there is depicted an example functional diagram of the computing device 500 configurable to implement certain non-limiting embodiments of the present technology including the training phase 200 and the in-use phase 400 of the present method for static analysis of executable files.

In some non-limiting embodiments of the present technology, the computing device 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing device 500 to function properly or to ensure the functioning of one or more of its components. The processor 501 may further be configured to execute specific machine-readable instructions stored in the at least one non-transitory computer-readable memory 502, for example, those causing the computing device 500 to execute one of the training phase 200 and the in-use phase 400.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of a network, to which the computing device 500 is communicative coupled, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing device 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for static analysis of executable files using predictive models, the method executable by a processor of a computing device, the method comprising:
   in a training phase:
   obtaining, by the processor, a plurality of training executable files, the plurality of training executable files including at least one malicious training executable file and at least one benign training executable file;

analyzing, by the processor, each one of the plurality of training executable files to extract data therefrom including a plurality of features of each one of the plurality of training executable files;

transforming, by the processor, the data organizing the plurality of features in sets of features, each set of features of which includes features of a respective predetermined type;

enriching, by the processor, a set of features of the sets of features with additional features of the respective predetermined type for increasing accuracy of a respective predictive model to be applied to the set of features, the respective predictive model having been configured for identifying informative features of the respective predetermined type, the informative features being indicative of a training executable file of the plurality of training executable files being one of malicious and benign, the enriching including:
  enriching the set of features with at least one of additional feature obtained after examining Portable Executable (PE) files and indicators of compromise having been identified by human specialists in analysis of malicious code;

applying, by the processor, to the set of features, the respective predictive model to identify therein the informative features indicative of the training executable file being one of malicious and benign, thereby generating at least one feature vector, training, by the processor, based on the at least one feature vector, at least one of an ensemble of classifiers to determine if an executable file is one of malicious and benign; and assigning, by the processor, to each one of the ensemble of classifiers, a respective weight value indicative of a priority of a respective predicted indicator thereof associated with the executable file amongst respective predicted indicators of other ones of the ensemble of classifiers;

in an execution phase:

obtaining, by the processor, the executable file;

analyzing, by the processor, the executable file, to extract therefrom data including execution features;

transforming, by the processor, the data organizing the execution features in at least one execution set of features;

generating, by the processor, based on the at least one execution set of features, a respective execution feature vector;

applying, by the processor, each one of the ensemble of classifiers to the respective execution feature vector to generate the respective predicted indicator of the executable file being one of malicious and benign;

applying, by the processor, to the respective predicted indicators generated by the ensemble of classifiers, respective weight values associated therewith to generate respective weighted predicted indicators of the executable file being one of malicious and benign;

determining, by the processor, an aggregate predicted indicator based on the respective weighted predicted indicators; and in response to the aggregate predicted indicator being indicative of the executable file being malicious, blocking, by the processor, the executable file.

2. The method of claim 1, wherein the respective predetermined data type of features associated with the training executable file is indicative of one of: (i) dense features including at least numerical attributes, further including at least one of: section sizes of the training executable file, sizes of the training executable file in a memory, a number of libraries of the training executable file, a number of imported symbols in of the training executable file; and indicators of compromise having been identified by human specialists in analysis of malicious code; (ii) strings; (iii) uniform resource locators (URLs); (iv) manifests including metadata of the training executable file; (v) imports including features extracted from an import table associated with the training executable file; (vi) exports including features extracted from an export table associated with the training executable file; (vii) resources including features extracted from a resource catalogue associated with the training executable file; (viii) blacklisted strings including strings having been identified as being suspicious; (ix) local variables thread local storage (tls) associated with the training executable file; and (x) relocations including features extracted from an address settings table associated with the training executable file.

3. The method of claim 1, wherein the transforming the data includes at least one of:
  cleaning the data, the cleaning including at least one of: filling missing values, detecting and removing data noise and outliers;
  transforming features of the set of features, the transforming including (i) normalizing the data of the features to reduce a dimensionality of the respective feature vector; and (ii) bringing the features to a predetermined range of values;
  compacting the data, the compacting including sampling at least one of the features and attributes to be included in the set of features;
  sampling the data, the sampling including converting continuous attributes to categorical attributes; and
  cleaning a text associated with the set of features, the cleaning including removing predetermined symbols.

4. The method of claim 3, wherein transforming a numerical feature includes applying at least one of: removal of the numerical feature, dummy substitution, mean substitution, frequently used value substitution, regression substitution, a maximum likelihood estimation (MLE) method, and the normalizing the data of the features includes applying at least one of: Z-scaling, linear scaling, and a principal component analysis (PCA).

5. The method of claim 3, wherein the transforming further includes transforming a text data into numerical data, including at least one of: label encoding by mapping each category to a respective predetermined unique integer; one-hot encoding; and vectorizing using a TF-IDF (Term Frequency-Inverse Document Frequency) algorithm.

6. The method of claim 1, wherein a quality of each one of the ensemble of classifiers is determined using an error minimization function in accordance with an equation:

$$0.8\frac{FP}{TN+FP} + 0.2\frac{FN}{TP+FN} \to \min,$$

where TN is a number of correctly classified benign executable files,

FP is a number of falsely classified benign executable files (type I error),

TP is a number of correctly classified malicious executable files, and

FN is a number of falsely classified malicious executable files (type II error).

7. The method of claim 1, wherein the respective weight value being inversely proportional to a respective error minimization function value determined when assessing a quality of a classifier of the ensemble of classifiers, and wherein the respective weight values associated with each one of the ensemble of classifiers are further normalized such that a sum thereof is equal to 1.

8. The method of claim 1, wherein a classifier of the ensemble of classifiers is built based on a Random Forest algorithm.

9. The method of claim 1, wherein, in response to the aggregate predicted indicator being indicative of the executable file being malicious, the method further comprises generating a report including an analysis result of the executable file; and wherein the analysis result includes one of: (i) a detailed analysis result including the respective weighted predicted indicators of each classifier in the ensemble of classifiers; and (ii) a complex analysis result including the aggregate predicted indicator of the ensemble of classifiers.

10. The method of claim 9, wherein a weighted predicted indicator, generated by a classifier of the ensemble of classifiers, in the detailed analysis result includes one of: a maliciousness score of the in executable file expressed as a value from 0 to 1, and a value of '−1' if the in use executable file includes no features of the respective predetermined type associated with the respective one of the ensemble of classifiers; and a categorical result determined based on an internal decision threshold of the respective one of the ensemble of classifiers and expressed as one of: "malicious", "benign", and "unknown".

11. The method of claim 9, wherein the complex result is expressed by one of: a number representative of the maliciousness score of the executable file taking values from 0 to 1, where 0 corresponds to the executable file being benign, and 1 corresponds to the executable file being malicious; and the categorical result which takes a value "malicious" if the aggregate predicted indicator of the ensemble of classifiers is greater than 0.5, and a value "benign" otherwise.

12. A system for static analysis of executable files using predictive models, the system comprising:
a processor; and
a non-transitory computer-readable medium storing instructions;
the processor, upon executing the instructions, being configured to:
in a training phase:
obtain a plurality of training executable files, the plurality of training executable files including at least one malicious training executable file and at least one benign training executable file;
analyze each one of the plurality of training executable files to extract data therefrom including a plurality of features of each one of the plurality of training executable files;
transform the data organizing the plurality of features in sets of features, each set of features of which includes features of a respective predetermined type;
enrich a set of features of the sets of features with additional features of the respective predetermined type for increasing accuracy of a respective predictive model to be applied to the set of features, the respective predictive model having been configured for identifying informative features of the respective predetermined type, the informative features being indicative of a training executable file of the plurality of training executable files being one of malicious and benign, by:
enriching the set of features with at least one of additional feature obtained after examining Portable Executable (PE) files and indicators of compromise having been identified by human specialists in analysis of malicious code;
apply to the set of features the respective predictive model to identify therein the informative features indicative of the training executable file being one of malicious and benign, thereby generating at least one feature vector,
train, based on the at least one feature vector, at least one of an ensemble of classifiers to determine if an executable file is one of malicious and benign; and
assign, to each one of the ensemble of classifiers, a respective weight value indicative of a priority of a respective predicted indicator thereof associated with the executable file amongst respective predicted indicators of other ones of the ensemble of classifiers;
in an execution phase:
obtain the executable file;
analyze, the executable file, to extract therefrom data including execution features;
transform the data organizing the execution features in at least one execution set of features;
generate, based on the at least one execution set of features, a respective execution feature vector;
apply each one of the ensemble of classifiers to the respective execution feature vector to generate the respective predicted indicator of the executable file being one of malicious and benign;
apply, to the respective predicted indicators generated by the ensemble of classifiers, respective weight values associated therewith to generate respective weighted predicted indicators of the executable file being one of malicious and benign;
determine an aggregate predicted indicator based on the respective weighted predicted indicators; and
in response to the aggregate predicted indicator being indicative of the in executable file being malicious, block the executable file.

* * * * *

UNITED STATES PATENT AND TRADEMARK OFFICE
CERTIFICATE OF CORRECTION

| | | |
|---|---|---|
| PATENT NO. | : 11,960,597 B2 | Page 1 of 1 |
| APPLICATION NO. | : 17/462107 | |
| DATED | : April 16, 2024 | |
| INVENTOR(S) | : Nikolay Prudkovskiy | |

It is certified that error appears in the above-identified patent and that said Letters Patent is hereby corrected as shown below:

In the Claims

Column 27, Claim 10, Line 29 should read --maliciousness score of the executable file expressed as a--

Column 27, Claim 10, Line 30 should read --a value from 0 to 1, and a value of '-1' if the executable--

Column 28, Claim 12, Line 56 should read --indicative of the executable file being malicious,--

Signed and Sealed this
Fourteenth Day of May, 2024

Katherine Kelly Vidal
*Director of the United States Patent and Trademark Office*